Nov. 3, 1931.  T. S. FARLEY  1,830,599
VAPOR ELECTRIC AMPLIFIER
Filed June 13, 1928

Inventor:
Theodore S. Farley,
by Charles W. Tullar
His Attorney.

Patented Nov. 3, 1931

1,830,599

UNITED STATES PATENT OFFICE

THEODORE S. FARLEY, OF SCOTIA, NEW YORK, ASSIGNOR TO GENERAL ELECTRIC COMPANY, A CORPORATION OF NEW YORK

VAPOR ELECTRIC AMPLIFIER

Application filed June 13, 1928. Serial No. 285,081.

My invention relates to electrical amplifying apparatus embodying electric discharge devices, and has for its object to provide an improved apparatus of this character for amplifying an alternating voltage without being affected in its energy output by relatively wide variations in the value of the voltage to be amplified and without utilizing any appreciable amount of energy from the voltage source.

An amplifying apparatus of this character finds ready application and great usefulness in connection with high voltage transmission lines and the like, with which coupling is made electrostatically for frequency or phase relation indications by capacity or condenser means. With such coupling means a relatively small amount of energy is available for actuating an indicating apparatus, and voltage variations of the source are relatively great, ranging, for example, from full line voltage with normal operation, to a few per cent of line voltage under short circuit conditions. With my improved apparatus, the desired frequency or phase relation indications are obtained substantially independently of voltage variations above a certain relatively low voltage limit.

In carrying out my invention, I make use of an electric discharge device of the vapor electric type which possesses desirable operating characteristics hereinafter pointed out, these characteristics being utilized in an amplifying apparatus which is particularly adapted to the uses above mentioned.

My invention will be better understood from the following description when considered in connection with the accompanying drawing, and its scope will be pointed out in the appended claims.

Figure 1:
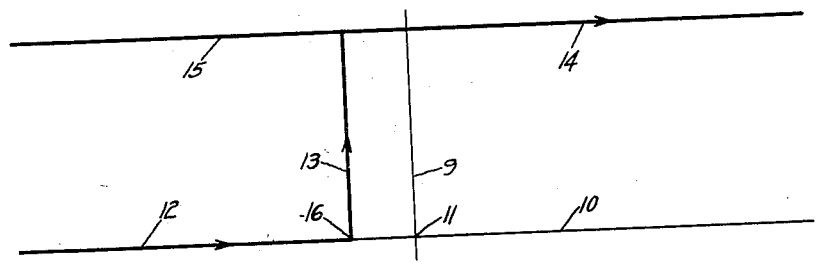
Figure 2:
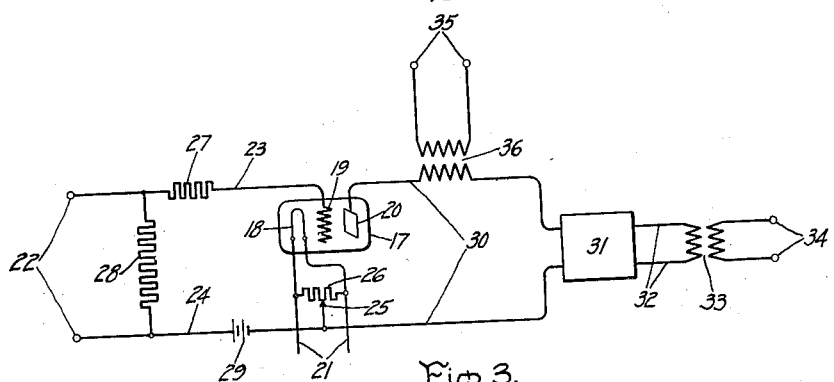
Figure 3:
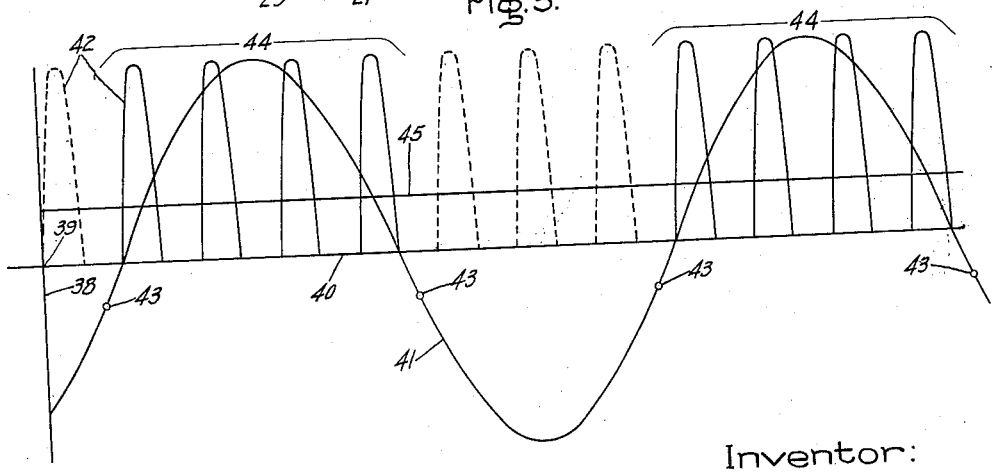

In the drawings, Fig. 1 is a curve illustrating an operating characteristic of a vapor electric device; Fig. 2 is a circuit diagram of an amplifying apparatus embodying my invention; and Fig. 3 is a series of curves illustrating the operation of the apparatus of Fig. 2.

Referring to Fig. 1, 9 and 10 are coordinates having a zero point 11, with plate or anode current of a vapor electric device plotted along ordinate 9 and positive and negative applied grid voltage values plotted along abscissa 10 to the right and left respectively from zero 11. The plate current curve 12—13—14—15— indicates that the plate current remains at zero along 12 as the negative grid voltage approaches zero in a positive direction, when at a point 16 near the zero value the plate current suddenly rises from zero to maximum along 13, and for grid voltages increasing through zero in a positive direction, it remains at the maximum value along 14.

If the grid voltage becomes negative, the plate current continues to remain at the maximum value along 14—15. Thus with a vapor electric device, having a direct current plate or anode supply, once the plate current is started it continues to flow without being affected by changes in the applied grid voltage. With an alternating plate voltage, however, the plate current is cut off during one-half of each cycle due to the rectifying characteristic of the device, and when the applied alternating grid voltage reaches a sufficiently negative value no plate current will flow after the next succeeding cut-off of such plate current.

For this reason in amplifying an alternating grid voltage, I apply an alternating voltage to the anode or plate circuit of the vapor electric device, and by means of the cut-off characteristic of the device as above explained, obtain in the anode circuit a series of alternating current impulses having the frequency of the plate supply and divided into groups having the frequency of the applied grid voltage. Harmonics of both the grid and plate voltages will also be present. By means of a suitable filter, such as a band-pass filter, energy of the frequency of the applied grid voltage only is passed into the output of the plate circuit. An apparatus for carrying out this method of operation is shown in Fig. 2, to which attention is now directed.

Referring to Fig. 2, 17 is a vapor electric device having a cathode 18, a control electrode or grid 19 and an anode 20. The cathode supply is taken through leads 21 from any suitable source (not shown) which may supply alternating current. An alternating voltage to be amplified is applied across input terminals indicated at 22 which lead to the grid and the cathode through circuit wires 23 and 24 respectively, the latter being connected with a mid-tap 25 on a resistor 26 shunted across cathode leads 21. This provides a center tap return to the cathode with alternating current cathode supply, to balance out voltage variations caused by the alternating current, as is well known.

Grid lead or wire 23 includes a grid impedance or resistor 27 for suppressing any tendency for any appreciable grid current to flow therein and prevents any appreciable energy drain from the voltage source or terminals 22. A relatively high resistance may be employed for this purpose for the reason that the voltage drop in the resistor is low when using a vapor electric device, and such device gives substantially constant energy output with wide variations in grid voltage above a certain low minimum value.

Voltage is applied to the grid through a resistor or impedance 28 connected between the grid lead or wire 23 and a bias means such as a battery 29, which in the present example, is connected in series with the cathode return wire 24. The resistor 28 may and should have a relatively high resistance in order not to place any appreciable load across the input terminals 22 unless the applied voltage source is of sufficient capacity to permit a load current to be drawn therefrom.

The plate or anode circuit of the vapor electric device is indicated at 30 and returns to the cathode through mid-tap connection 25. In this circuit is an alternating current filter indicated at 31, the purpose of which will be explained hereinafter and which is connected through leads 32 and a suitable coupling means, such as a transformer 33, with output terminals 34 which are adapted to connect with any load circuit wherein the energy resulting from the amplified alternating grid voltage, is to be utilized.

The plate circuit is provided with alternating plate voltage supply terminals 35 with which it is connected in the present example by a transformer 36. Terminals 35 are supplied with alternating current energy from any suitable source and of a frequency differing from the frequency applied to the grid. It is preferably held at an exact multiple of the grid frequency, although in practice this is more difficult to do than to merely provide a frequency difference. Transformer 36 is used to effect the desired voltage transformation between the supply means and the plate circuit.

With an alternating voltage applied to the grid through terminals 22, the alternating plate current is cut off at each half cycle of the grid voltage in groups having the frequency of the grid voltage, by reason of the grid control characteristic of the amplifier device, as explained in connection with Fig. 2. That is, the alternating plate current which is broken into half wave impulses by reason of the rectifying action of the device is, in turn, broken into groups having the frequency of the grid voltage. This requires a higher frequency supply for the plate circuit than the frequency of the applied grid voltage, and for practical operation it is desirable to have the difference in frequency between them relatively large. For example, in amplifying a 60 cycle frequency it is preferable to use a plate or anode supply of from 500 to 1000 cycles. This relatively wide difference in frequencies results in a smoother reproduction of the amplified grid frequency than is possible with frequencies more nearly equal unless the plate frequency is held at an exact multiple of the grid frequency, as above mentioned.

The reason for this wide frequency difference is that the number of plate current impulses or half waves which are included in each group, are at intervals increased by one impulse or portion thereof because unless special provision is made, the plate frequency may not be an even or exact multiple of the grid frequency. By making the frequency of the plate supply relatively high the occasional extra plate current impulse included in a group by reason of the plate frequency not being an exact multiple of the grid frequency becomes a relatively small percentage of the usual number of impulses included in a group, and will therefore cause only a slight and permissible ripple in the final output of amplified grid frequency. The ripple will then be of a relatively low frequency below that of the applied grid voltage.

However, if the plate frequency is held by some suitable means at an exact multiple of the grid frequency, then such wide difference between these frequencies is not necessary because there will be no extra occasional half wave of the plate current and the ripple occasioned thereby. Hence if a lower plate frequency approaching that of the grid frequency is desired, the plate frequently should preferably be an exact multiple of the grid frequency, and must necessarily be an exact multiple thereof for a smooth output having the grid frequency only.

The curves in Fig. 3, to which along with Fig. 2, attention is now directed, serve to illustrate the above features of the operation of the amplifier. In Fig. 3 the ordinate 38 represents amplitude, positive values thereof being above the zero point 39 and negative values below the same. The abscissa 40 represents time or intervals of time. Curve 41 represents an alternating low frequency voltage as applied to the grid at input terminals 22, and curves 42 the rectified high frequency plate current impulses, the dotted curves being those cut off by reason of the grid voltage being sufficiently negative to stop the flow of plate current, the cut-off points on the grid voltage curve being indicated at 43. From the curves it will be seen that plate current impulses are broken into groups 44 having the frequency of the grid voltage.

These groups of impulses, together with harmonics of the grid and plate voltages and the low frequency ripple above mentioned, flow in plate circuit 30 and are removed by a suitable filter 31. In the present example for 60 cycle grid voltage, this is a band-pass filter having a cut-off frequency characteristic slightly above and slightly below the grid frequency. In the case of the 60-cycle grid frequency, this should have a lower cut-off point between 60 and 30 cycles, preferably about 40 cycles, and a higher cut-off point between 60 and 120 cycles, preferably about 90 cycles. Relative to the anode or plate voltage frequency, this represents only a narrow higher frequency margin above and below the desired grid voltage frequency.

Curve or line 45 represents the direct current component of the high frequency plate current after passing through the filter. This is cut off or removed from the load circuit and terminals 34 by transformer 33 so that the energy delivered to terminals 34 has only the frequency of the grid voltage.

While I have illustrated and described my invention in connection with a simple amplifier circuit, it should be understood that it is not limited thereto and the method followed may be carried out in connection with other amplifier circuits. Any suitable vapor electric device of the character indicated by the curve in Fig. 1 may be used. Such devices are not ordinarily adapted for use as amplifiers. However, they are capable of operating with low anode or plate voltage and with relatively low energy input of low voltage. Hence when arranged and operated in accordance with my invention, an alternating voltage amplifier having desirable characteristics results and is adapted for a variety of uses, one of which is as mentioned, in connection with the amplification of frequency or phase relation indications through capacity couplings with high tension transmission lines and the like, independently of wide voltage variations in such lines.

What I claim as new and desire to secure by Letters Patent of the United States is:—

1. The method of operating a vapor electric device which comprises applying an alternating grid voltage thereto, energizing the anode thereof from an alternating voltage source at a relatively higher frequency than that of the grid voltage, and filtering from the output current of said device, currents of frequencies above and below that of the grid voltage.

2. The method of operating a vapor electric device as an amplifier, which comprises applying an alternating grid voltage thereto, energizing the anode thereof from an alternating voltage source at a higher frequency which is an exact multiple of the grid voltage, and filtering from the output of said device, currents of frequencies above and below that of the grid voltage.

3. In combination, an electric discharge device of the vapor electric type having a control electrode, means for applying an alternating control voltage thereto from one source at a certain frequency, an anode circuit, means connected with said anode circuit for supplying alternating current thereto from another source at a certain other and higher frequency and a band-pass filter in said anode circuit between said device and the output terminals of said circuit, said filter being responsive to pass energy within a frequency band including the frequency of the control voltage.

4. In an electrical amplifying apparatus, the combination of an electric discharge device of the vapor electric type having a control electrode and an anode, means for applying an alternating voltage to said control electrode, means connected with said electrode for limiting current flow thereto, an anode circuit for said device, means connected with said anode circuit for supplying alternating current thereto of a frequency higher than that of the alternating voltage applied to said control electrode, and means providing a filter for other than the control electrode voltage frequency connected in shunt to the output terminals of said anode circuit.

5. The combination with a vapor electric device having a control electrode and an anode, of means for applying an alternating voltage to said electrode, means for applying an alternating voltage to the anode at a frequency which is an exact multiple of that of the grid voltage, an anode circuit through which said means is connected with said device, and a band-pass filter in said circuit.

6. The combination with a vapor electric device having a grid circuit, of means for applying an alternating voltage to said grid circuit, a grid impedance in series with said grid circuit, an anode circuit including alternating current supply terminals and output terminals, a source of alternating current of a frequency widely different from and higher than the frequency of said grid voltage connected to said supply terminals, and an alternating current filter interposed in the anode circuit between said supply and output terminals, said filter being tuned to pass a narrow band of frequencies including that of the voltage applied to said grid circuit.

7. The combination with a vapor electric device having a grid circuit including a source of alternating voltage of relatively low frequency and an anode circuit, of means in the grid circuit for suppressing current flow therein to the grid, means in said anode circuit for supplying thereto alternating current energy of a frequency relatively high with respect to that of said grid voltage, a filter in the anode circuit for preventing the passage of frequencies other than a relatively narrow frequency band including the frequency of the grid circuit, and means connected with the anode circuit for receiving the filtered output therefrom.

8. The combination with a vapor electric device having a grid circuit including a source of alternating voltage of relatively low frequency and an anode circuit, of means in the grid circuit for suppressing current flow to the grid, means in said anode circuit for supplying alternating current energy thereto of relatively high frequency, a filter in the anode circuit for preventing the passage of frequencies other than a relatively narrow frequency band including that of the grid circuit, and means connected with the anode circuit for receiving the filtered output therefrom, said means including a transformer, the primary of which is connected with the anode circuit.

In witness whereof, I have hereunto set my hand this 12th day of June, 1928.

THEODORE S. FARLEY.